US012119631B2

United States Patent
Sato et al.

(10) Patent No.: US 12,119,631 B2
(45) Date of Patent: Oct. 15, 2024

(54) ELECTRICAL CONNECTION BOX

(71) Applicant: Sumitomo Wiring Systems, Ltd., Yokkaichi (JP)

(72) Inventors: Yoshiharu Sato, Yokkaichi (JP); Takumi Ejima, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 367 days.

(21) Appl. No.: 17/647,211

(22) Filed: Jan. 6, 2022

(65) Prior Publication Data

US 2022/0224094 A1 Jul. 14, 2022

(30) Foreign Application Priority Data

Jan. 8, 2021 (JP) ................. 2021-002246

(51) Int. Cl.
*H01H 85/20* (2006.01)
*H02G 3/14* (2006.01)
*H02G 5/02* (2006.01)

(52) U.S. Cl.
CPC ................. *H02G 3/14* (2013.01); *H02G 5/02* (2013.01); *H01H 2085/2075* (2013.01)

(58) Field of Classification Search
CPC ........................ H02G 3/14; H02G 5/02; H01H 2085/2075–209
See application file for complete search history.

(56) References Cited

U.S. PATENT DOCUMENTS

| | | | | |
|---|---|---|---|---|
| 9,444,183 B2* | 9/2016 | Degen | ................. | H01R 13/627 |
| 9,831,647 B2* | 11/2017 | Kakoi | ................. | H05K 7/1401 |
| 2003/0109150 A1* | 6/2003 | Saka | ................. | H01R 13/5213 |
| | | | | 439/76.2 |
| 2010/0055962 A1* | 3/2010 | Ikeda | ................. | H01H 50/048 |
| | | | | 439/345 |
| 2011/0299229 A1* | 12/2011 | De La Reza | ....... | B60R 16/0238 |
| | | | | 361/624 |
| 2016/0072222 A1* | 3/2016 | Hasegawa | ............ | H01H 50/048 |
| | | | | 439/382 |

FOREIGN PATENT DOCUMENTS

JP 2016-025736 A 2/2016

* cited by examiner

*Primary Examiner* — Jacob R Crum
(74) *Attorney, Agent, or Firm* — Honigman LLP

(57) ABSTRACT

A portion that covers a connection portion between a relay and a bus bar is prevented from coming off. An electrical connection box includes a relay, a bus bar connected to the relay, and a case including an attachment portion for the relay, and includes a cover covering a connection portion between the relay and the bus bar. The cover includes a wall portion and an engaging portion that is provided on a part of the wall portion and prevents the cover from coming off by engaging with a part of the attachment portion. The attachment portion includes a stopper portion that suppresses displacement of the part of the wall portion in a direction in which the engaging portion is disengaged.

5 Claims, 11 Drawing Sheets

Prior Art

Prior Art

ELECTRICAL CONNECTION BOX

CROSS-REFERENCE TO RELATED APPLICATIONS

This application claims priority of Japanese Patent Application No. JP 2021-002246 filed on Jan. 8, 2021, the contents of which are incorporated herein.

TECHNICAL FIELD

The present disclosure relates to an electrical connection box.

BACKGROUND

In an automobile, for example, in order to supply electric power from a battery to each of a plurality of in-vehicle devices, electric wires from the battery are connected to an electrical connection box (also referred to as a "junction box"), and electric wires are connected from the electrical connection box to the respective in-vehicle devices. The electrical connection box includes a case that houses a relay (relay box). JP 2016-25736A discloses such an electrical connection box.

SUMMARY

The electrical connection box has an upper case to which relays are attached and a lower case for covering bus bars connected to the relays from below. FIG. 10 is a perspective view of relays 91 and bus bars 92 housed in the case of the electrical connection box. The bus bars 92 are connected to the terminals of the relays 91 by, for example, bolts 93. In order to prevent electric shock, the electrical connection box requires a sealing structure that prevents a person from touching the connection portions between the relays 91 and the bus bars 92.

FIG. 11 is a perspective view showing a conventional example of the sealing structure. Conventionally, a lower case 99 has sealing structure portions 98 that cover the connection portions (heads of the bolts 93) between the relays 91 and the bus bars 92. The lower case 99 further has an engaging hook 97, and due to the engaging hook 97 engaging with a portion of the upper case (not shown), the upper case and the lower case 99 form a single piece with each other.

In some cases, the lower case 99 is removed from the upper case when the operator handles the electrical connection box for maintenance or the like. Since the sealing structures 98 are part of the lower case 99, if the lower case 99 comes off, there is a possibility that the connection portions between the bus bars 92 and the relays 91 will be unintentionally exposed.

In view of this, it is an object of the present disclosure to provide an electrical connection box capable of preventing the portion covering the connection portions between the relays and the bus bars from coming off.

An electrical connection box according to an aspect of the present disclosure is an electrical connection box including a relay, a bus bar connected to the relay, and a case including an attachment portion for the relay, the electrical connection box including a cover covering a connection portion between the relay and the bus bar, in which the cover includes a wall portion and an engaging portion that is provided at a part of the wall portion and prevents the cover from coming off by engaging with a part of the attachment portion, and the attachment portion includes a stopper portion for suppressing displacement of the part of the wall portion in a direction in which the engaging portion is disengaged.

According to the present disclosure, it is possible to prevent the portion covering the connection portions between the relays and the bus bars from coming off, and thus safety is high.

DETAILED DESCRIPTION OF PREFERRED EMBODIMENTS

Figure 1:
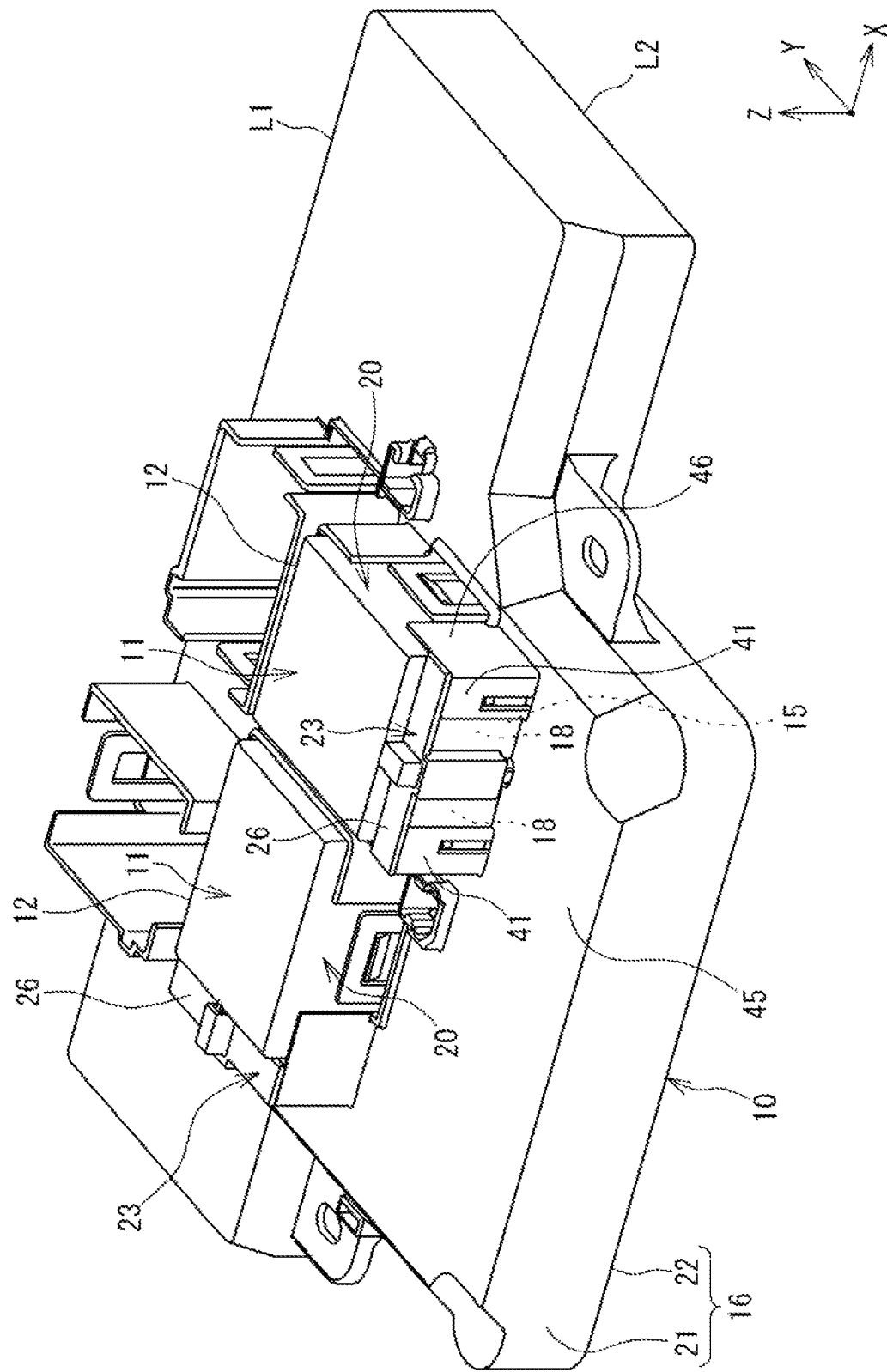
FIG. 1 is a perspective view of an electrical connection box according to the present embodiment.

Hereinafter, overviews of the embodiments of the present disclosure will be listed and described.

The electrical connection box of this embodiment is an electrical connection box including a relay, a bus bar connected to the relay, and a case including an attachment portion for the relay, the electrical connection box including a cover covering a connection portion between the relay and the bus bar, in which the cover includes a wall portion and an engaging portion that is provided at a part of the wall portion and prevents the cover from coming off by engaging with a part of the attachment portion, and the attachment portion includes a stopper portion for suppressing displacement of the part of the wall portion in a direction in which the engaging portion is disengaged.

According to the electrical connection box of the present embodiment, the engagement portion provided at the part of the wall portion of the cover prevents the cover covering the connection portion between the relay and the bus bar from coming off of the attachment portion of the case. The stopper portion of the attachment portion suppresses the displacement of the part of the wall portion in the direction in which the engaging portion is disengaged. For this reason, it is possible to prevent the cover from coming off, and thus safety is high.

Also, preferably, the stopper portion has a spring property for biasing the part of the wall portion in a direction opposite to the direction in which the engaging portion is disengaged.

In this case, if, in a state in which a relay with a bus bar is installed at the attachment portion of the case, the cover is attached to the connection portion between the relay and the bus bar, the stopper portion can elastically deform even when pushed by the wall portion of the cover, and thus attachment is easy. Then, once the cover is attached, the stopper portion can suppress the displacement of the part of the wall portion in the direction in which the engaging portion is disengaged, and can prevent the cover from coming off.

Also, preferably, the case includes a first case including the attachment portion, and a second case that covers at least a part of the attachment portion of the first case and is configured to form a single piece with the first case, and the cover includes, on the second case side, an opening through which the bus bar is passed between the relay and the cover.

In this case, the bus bar can be arranged pulled out from the opening of the cover. The bus bar pulled out from the opening is stored between the first case and the second case. The bus bar pulled out from the opening can be arranged bent toward the relay as-is, or arranged bent to the opposite side. That is, the degree of freedom in the arrangement (routing) of the bus bars is improved.

Also, preferably, the attachment portion includes a first piece portion and a second piece portion that sandwich the wall portion, the engaging portion is formed on the first piece portion side of the wall portion, an engaged portion with which the engaging portion engages is formed on the first piece portion, and the second piece portion includes the stopper portion.

In this case, the cover is attached such that the wall portion is sandwiched between the first piece portion and the second piece portion of the attachment portion. When the cover is attached in this way, the engaging portion engages with the engaged portion of the first piece portion, and the stopper portion of the second piece portion suppresses displacement of the part of the wall portion in the direction in which the engaging portion disengages. That is, if the cover is attached, the function of the engaging portion and the stopper portion for preventing the cover from coming off is established.

Also, preferably, the engaging portion is constituted by a hook that protrudes from the wall portion, and the engaged portion is constituted by a hole that passes through the first piece portion.

In this case, it is easy to visually confirm that the engaging portion (hook) is engaged with the engaged portion (hole), and thus the safety of the cover increases.

Hereinafter, the details of the embodiments of the present disclosure will be described with reference to the drawings. Note that at least some of the embodiments described below may also be combined as appropriate.

The electrical connection box 10 (see FIG. 1) of the present embodiment is mounted in, for example, an automobile, and is used to supply electric power from an in-vehicle battery to each of a plurality of in-vehicle devices, although this is not shown in the drawings. That is, electric wires from the in-vehicle battery are connected to the electrical connection box 10, and the electric wires are respectively connected to the in-vehicle devices from the electrical connection box 10.

Overall Configuration of Electrical Connection Box 10

Figure 2:
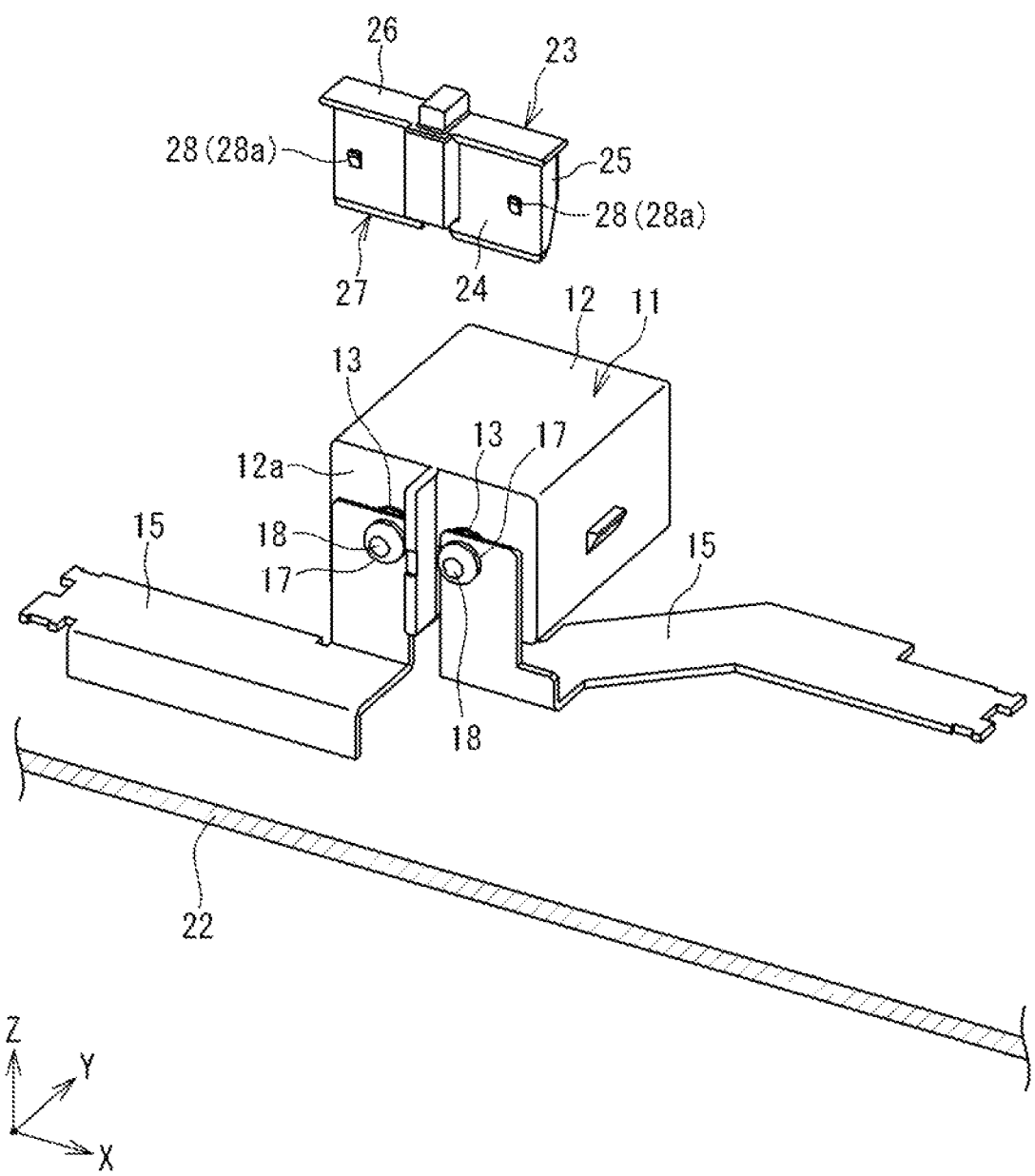
FIG. 2 is a perspective view of a relay and bus bars.

FIG. 1 is a perspective view of the electrical connection box 10 according to the present embodiment. FIG. 2 is a perspective view of a relay 11 and bus bars 15. FIG. 2 also shows a cover 23, which will be described later. The electrical connection box 10 includes a relay 11, bus bars 15 connected to the relay 11, and a case 16 to which the relay 11 with the bus bars 15 is attached. The electrical connection box 10 has a plurality of relays 11. In FIG. 1, two relays 11 are provided in the case 16, but the number of relays 11 is not limited. The relay 11 of the present embodiment is a high-voltage relay, and the electrical connection box 10 is a high-voltage electrical connection box.

Up, down, front, rear, left, and right are defined in relation to the electrical connection box 10 of the present disclosure. The case 16 has a box shape that is flat overall, although it includes recesses and protrusions. The flattened direction, that is, the direction in which the thickness is less, is defined as the vertical direction. The relay 11 is fitted and attached from one side of the case 16 (the upper side in FIG. 1). The side on which the relay 11 is fitted is defined as "the upper side". Also, the direction along a long side L1 of the case 16 is defined as the left-right direction, and the direction along a short side L2 of the case 16 is defined as the front-rear direction. Each drawing shows XYZ orthogonal coordinates. The Z direction is the direction from the bottom to the top (vertical direction), the Y direction is the front-rear direction (the direction from the front to the rear), and the X direction is the left-right direction (the direction from left to right).

FIG. 2 shows the relay 11 on the right side of the electrical connection box 10 shown in FIG. 1. The relay 11 is formed as a relay box having a box body 12, and the relay main body is housed in the box body 12. Terminals (fastening portions) 13 to which the bus bars 15 are connected are provided on the outer surface of the box body 12. The terminals 13 are provided on one of the front, rear, left, and right side surfaces of the box body 12 of the relay 11. In the case of the relay 11 shown in FIG. 2, the terminal 13 is provided on the front side surface of the box body 12. The bus bars 15 are attached to the terminals 13 by bolts 17. Two buses 15 are connected to one relay 11. The portions where the bus bars 15 are connected to the terminals 13 by the bolts 17 are referred to as "connection portions 18".

Figure 3:
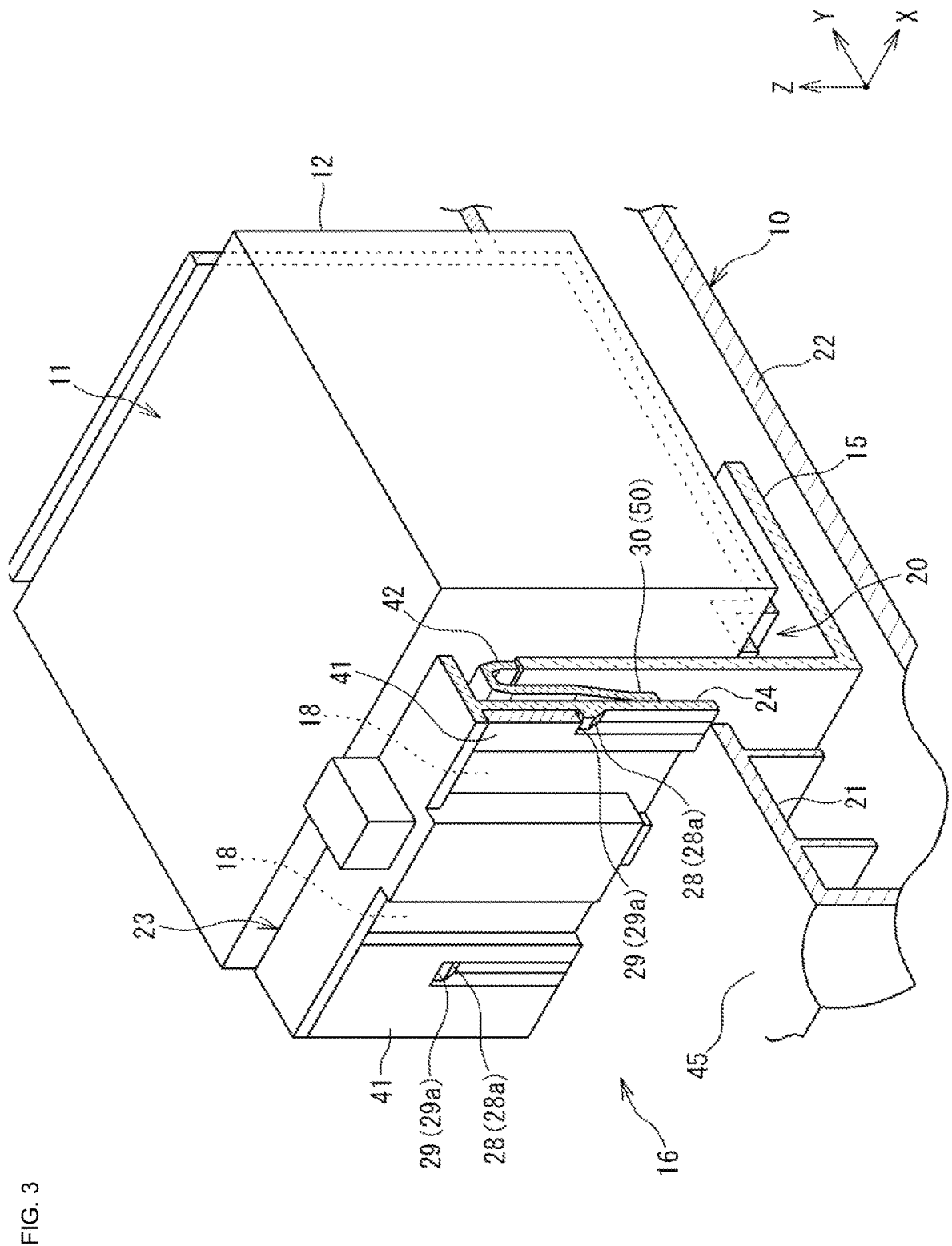
FIG. 3 is a perspective view showing a state in which a relay located on the right side in FIG. 1 is attached to an attachment portion.

In FIG. 1, the case 16 has attachment portions 20 for attaching the relays 11. Although not shown in the drawing, the case 16 has connection portions for cables for connecting to each of a plurality of in-vehicle devices. FIG. 3 is a perspective view showing a state in which the relay 11 located on the right side in FIG. 1 is attached to the attachment portion 20, and a part of the case 16 is shown as a cross section. The case 16 is made of resin, and in the present embodiment, the case 16 has a first case 21 and a second case 22. The first case 21 has the above-described attachment portions 20. The attachment portion 20 is a portion having a recessed shape in which the relay 11 is fitted in and mounted from above the case 16 (first case 21). The attachment portion 20 is a portion that is molded at the same time when the first case 21 is molded (injection molded) with resin, and is a part of the first case 21. The second case 22 is separate from the first case 21 and has a plate shape.

The attachment portion 20 is open on the upper side, but the first case 21 is open on the lower side overall. The second case 22 functions as a lid (bottom plate) that closes the opening on the lower side of the first case 21. The first case 21 is also called the upper case, and the second case 22 is also called the lower case. A flat plate portion 45 included in the first case 21 covers the bus bars 15 extending from the relays 11 attached to the attachment portions 20, from above.

The second case 22 covers at least a part of the attachment portions 20 of the first case 21 from below, and forms a single piece with the first case 21. More specifically, the second case 22 covers the bus bars 15 extending from the relays 11 attached to the attachment portions 20, from below, and forms a single piece with the first case 21. The second case 22 is detachably attached to the first case 21.

As described above, the case 16 has a first case 21 that has the attachment portions 20 and a second case 22.

Figure 4:
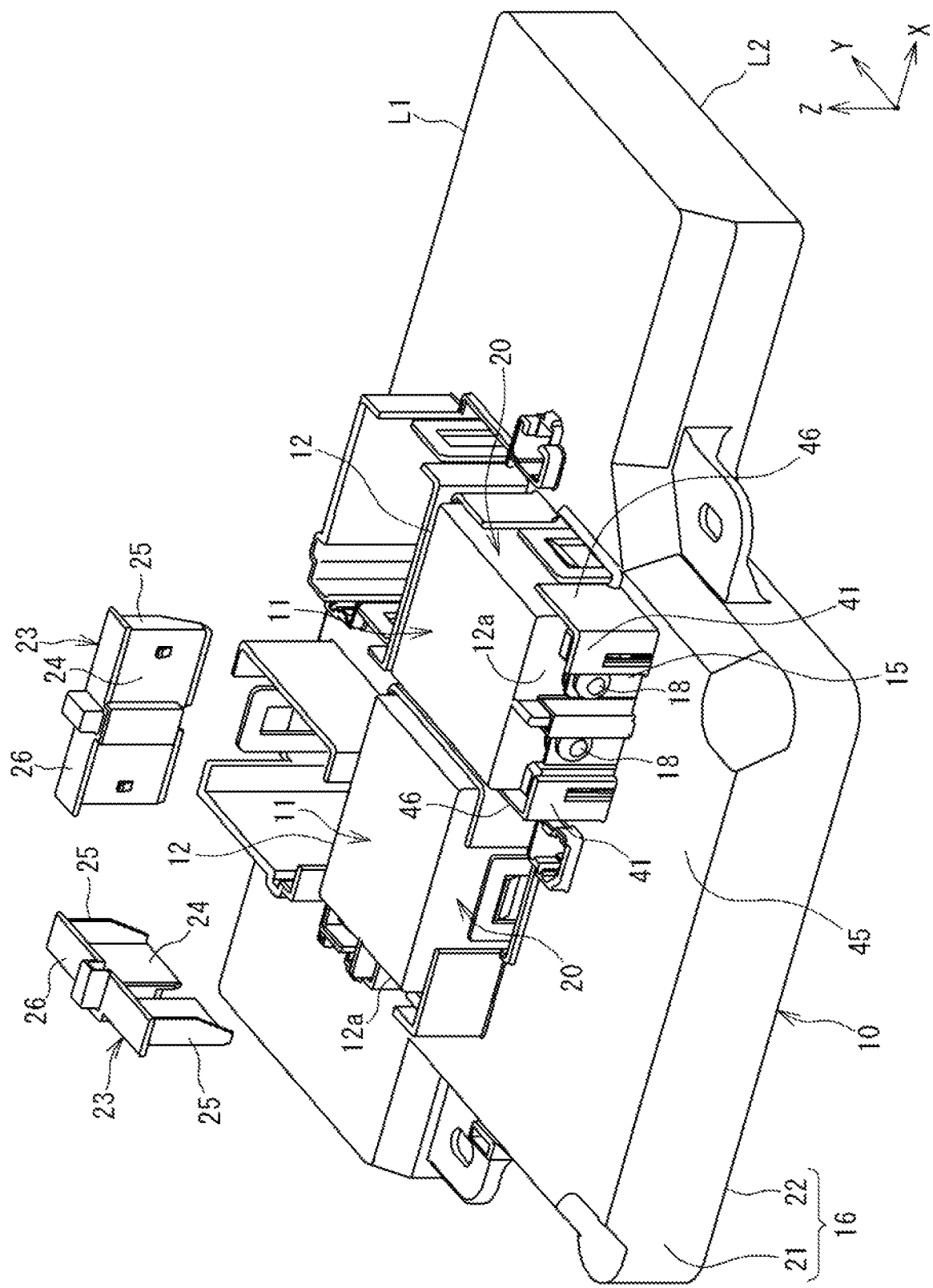
FIG. 4 is a perspective view of the electrical connection box shown in FIG. 1 with the covers removed.
Figure 5:
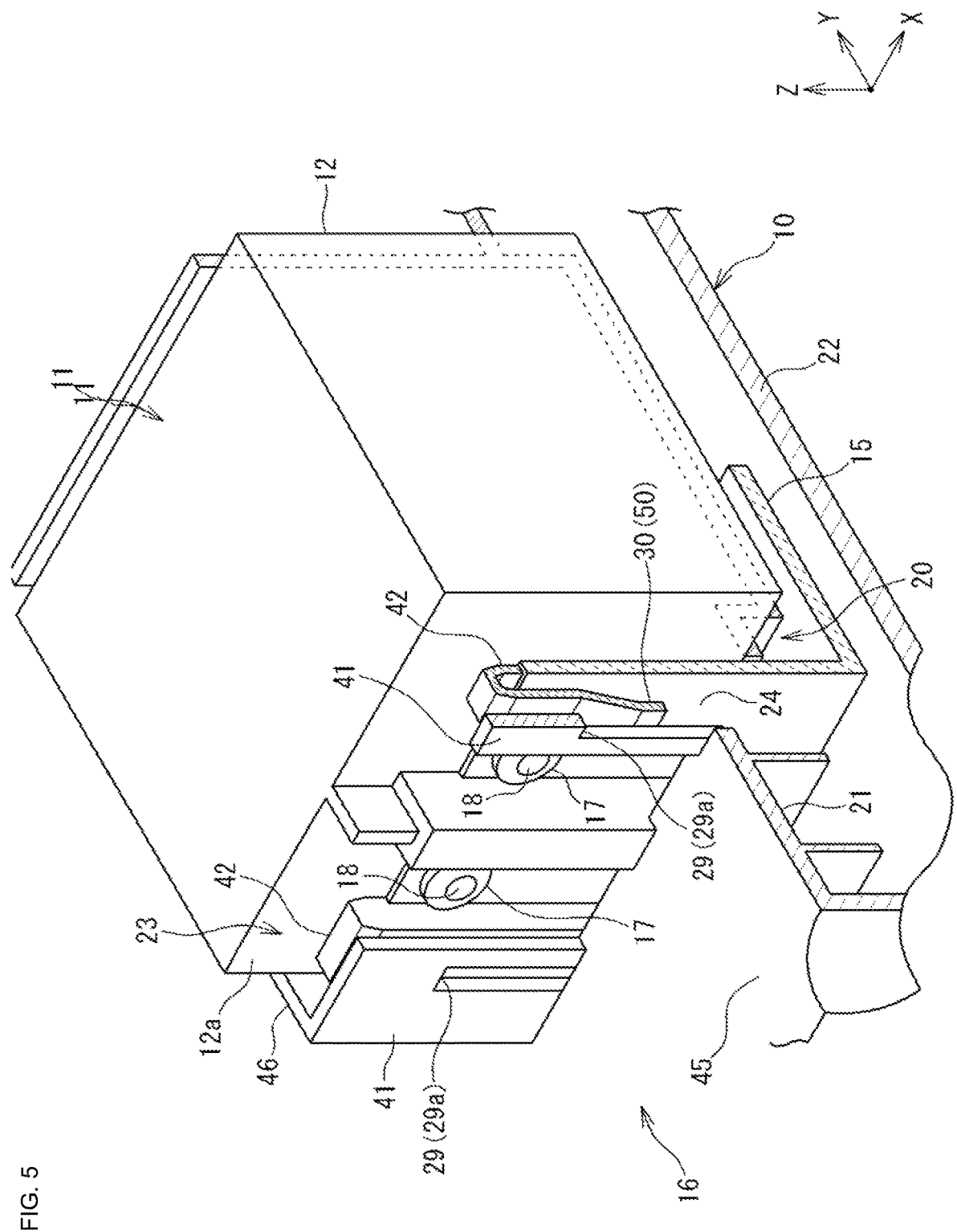
FIG. 5 is a perspective view of the relay and the attachment portion shown in FIG. 3, with the cover removed.
Figure 6:
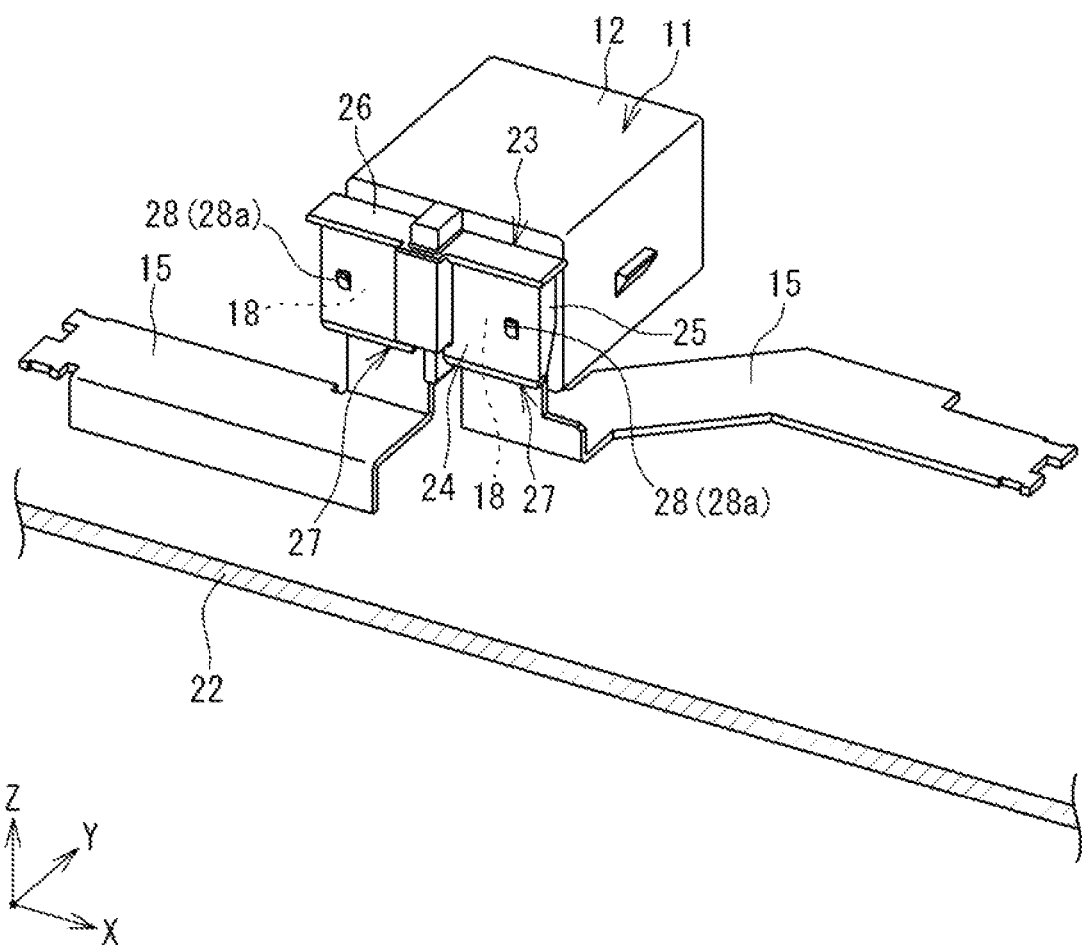
FIG. 6 is a perspective view of a relay and bus bars.

As shown in FIGS. 1 and 3, the electrical connection box 10 includes covers 23 that cover the connection portions 18 between the relays 11 and the bus bars 15. FIGS. 1 and 3 show a state in which the covers 23 are mounted on the case 16, and FIGS. 4 and 5 show a state before the covers 23 are mounted (a state in which the covers 23 are removed). FIG. 2 shows a state before the connection portions 18 are covered by the cover 23, and FIG. 6 shows a state in which the connection portions 18 are covered by the cover 23. The covers 23 are made of an insulating member, and are made of resin in this embodiment. The covers 23 are separate components from the case 16, and are attached close to the respective relays 11 with the bus bars 15 mounted in the attachment portions 20 from above.

In FIG. 4, the attachment portion 20 and the cover 23 for the relay 11 on the right side and the attachment portion 20 and the cover 23 for the relay 11 on the left side have different attachment directions, but have the same configuration. The cover 23 on the right side will be described below.

The cover 23 includes a front wall portion 24 that covers a front side surface 12a of the relay 11 (box body 12) on which the connection portions 18 are located, two side wall portions 25 that are provided extending from the left and right sides of the front wall portion 24 toward the relay 11 (box body 12) side, and an upper wall portion 26 that covers the space formed between the front wall portion 24 and the two side wall portions 25 from above. The connection portions 18 are housed in the space in a state in which the cover 23 is attached to a specified position of the attachment portion 20 (hereinafter referred to as "mounted state"). Also, in the mounted state, openings 27 (see FIG. 6) that open downward are formed between the cover 23 and the relay 11. The openings 27 are open toward the second case 22 side, and the bus bars 15 are pulled out from the openings 27. That is, the cover 23 includes, on the second case 22 side, openings 27 through which the bus bars 15 are passed between the relay 11 and the cover 23.

Regarding the Attachment Structure of the Cover 23

Figure 7:
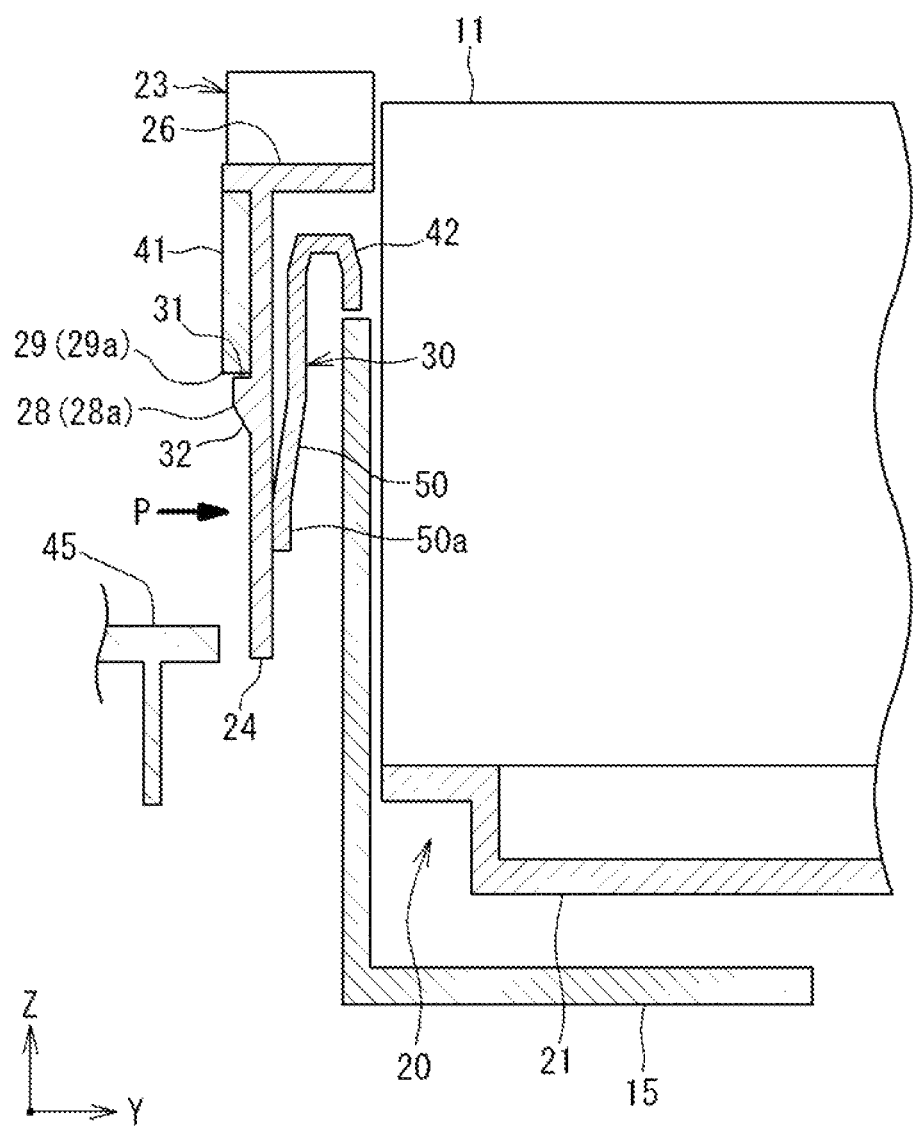
FIG. 7 is a cross-sectional view of a cover and an attachment portion, and is a view of a state in which the cover is mounted.
Figure 8:
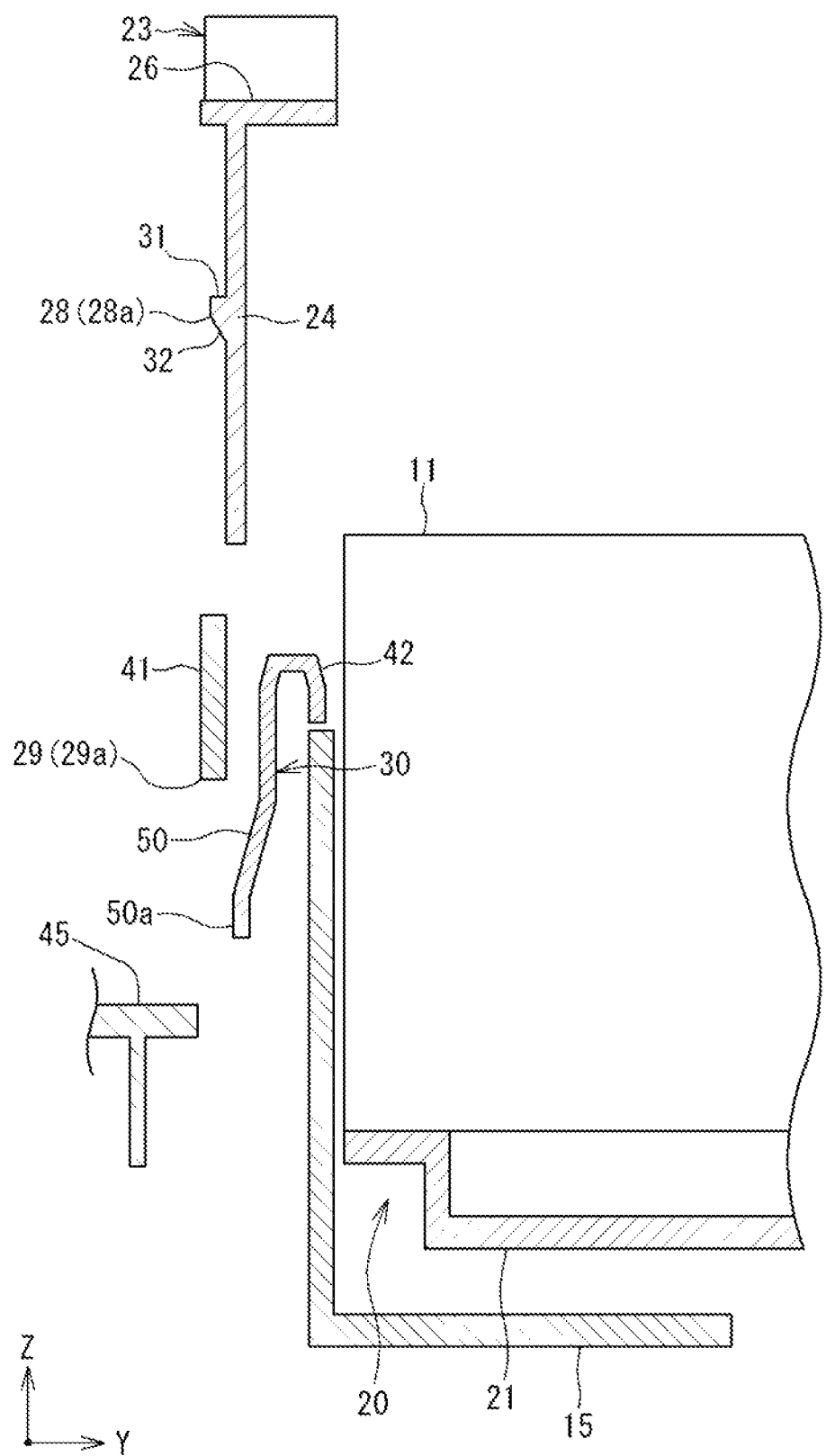
FIG. 8 is a cross-sectional view of a cover and an attachment portion, and is a view of a state before mounting the cover.

As shown in FIGS. 2 and 6, the cover 23 has the front wall portion 24 for covering the connection portions 18 as described above. The cover 23 has engaging portions 28, and each engaging portion 28 is provided on a part of the front wall portion 24. As will be described later, engaged portions 29 (see FIGS. 7 and 8) with which the engaging portions 28 engage are formed on a first piece portion 41 of the attachment portion 20. FIGS. 7 and 8 are cross-sectional views of the cover 23 and the attachment portion 20. FIG. 7 shows the state in which the cover 23 is mounted, and FIG. 8 shows the state before the cover 23 is mounted.

The engaging portion 28 is constituted by a hook 28a protruding from the front wall portion 24. The hook 28a has an upper locking surface 31 and an inclined surface 32 provided below the locking surface 31. The locking surface 31 forms the upper surface of the hook 28a and is a surface extending along a virtual plane (X-Y plane) orthogonal to the vertical direction. The inclined surface 32 is a surface that is inclined with respect to a virtual plane (X-Z plane) in the vertical direction, and is a surface that approaches the front wall portion 24 side from the top to the bottom.

FIG. 3 shows a state in which the cover 23 is mounted, and FIG. 5 shows a state before mounting. As shown in FIGS. 3, 5, 7, and 8, the attachment portion 20 of the first case 21 includes the first piece portion 41 and a second piece portion 42 that sandwich the front wall portion 24 of the cover 23 in the front-rear direction. The first piece portion 41 and the second piece portion 42 are portions that are molded at the same time when the first case 21 is molded, and are a part and another part of the attachment portion 20. In one attachment portion 20 for one relay 11, two left and right first piece portions 41 and two left and right second piece portions 42 are provided.

In FIG. 5, the first piece portions 41 are each a wall-shaped portion that is provided so as to extend upward from the flat plate portion 45 of the first case 21. The flat plate portion 45 is a portion forming the upper surface of the first case 21, and covers the bus bars 15 from above. The first piece portions 41 are continuous with respective side plate portions 46 that cover the relay 11 from the left and right sides. Each side plate portion 46 is also a wall-shaped portion, is provided extending upward from the flat plate portion 45, and is included in the attachment portion 20.

The engaged portion 29 with which the engaging portion 28 composed of the hook 28a engages is formed on the first piece portion 41. In the present embodiment, the engaged portion 29 is composed of a hole 29a passing through the first piece portion 41. As described above (see FIG. 3), the hook 28a is formed on the first piece portion 41 side of the front wall portion 24 of the cover 23.

With the cover 23 mounted (e.g., see FIG. 3), that is, in a state in which the cover 23 is located between the relay 11 and the first piece portions 41 and is mounted at a defined position, the hooks 28a are respectively engaged with the holes 29a of the first piece portions 41. As a result, the cover 23 cannot be displaced upward and is attached to the attachment portion 20. More specifically, as shown in FIG. 7, in the mounted state, the locking surface 31 on the upper side of the hook 28a comes into contact with the upper surface of the hole 29a, and the cover 23 cannot be displaced upward. Note that in the state where the cover 23 is mounted, a part of the cover 23 (e.g., the upper wall portion 26) comes into contact with a part of the attachment portion 20 (first piece portion 41) from above. Accordingly, the cover 23 is in the mounted state and cannot be displaced in the vertical direction.

In this manner, the engaging portions 28 (hooks 28a) of the cover 23 prevent the cover 23 from coming off by engaging with a part of the attachment portion 20 (the holes 29a of the first piece portions 41).

When a change is made from the state before the cover 23 is mounted shown in FIG. 8 to the mounted state shown in FIG. 7, the hook 28a moves downward while being in contact with the first piece portion 41. At this time, one or both of the front wall portion 24 and the first piece portion 41 of the cover 23 can be gradually elastically deformed by the inclined surface 32 of the hook 28a, and the mounting of the cover 23 is not hindered. That is, the inclined surface 32 of the hook 28a functions as a guide used when the cover 23 is mounted. When the hook 28a reaches the hole 29a, the elastic deformation is eliminated and the hook 28a engages with the hole 29a.

Here, in the case of the configuration of the hook 28a of the cover 23 and the hole 29a of the first piece portion 41 as described above, there is a possibility that the hole 29a and the hook 28a will be disengaged when the hook 28a engaged with the hole 29a is forcibly pushed toward the relay 11 side together with the part of the front wall portion 24. That is, the direction in which the hook 28a and the part of the front wall portion 24 on which the hook 28a is formed are pushed toward the relay 11 side is the direction in which the engaging portion 28 is disengaged. This direction is indicated by an arrow P in FIG. 7.

In view of this, the attachment portion 20 has a stopper portion 30 that suppresses displacement (deformation) of the part of the front wall portion 24 in the direction in which the engaging portion 28 is disengaged. Hereinafter, the stopper portion 30 will be described.

Figure 9:
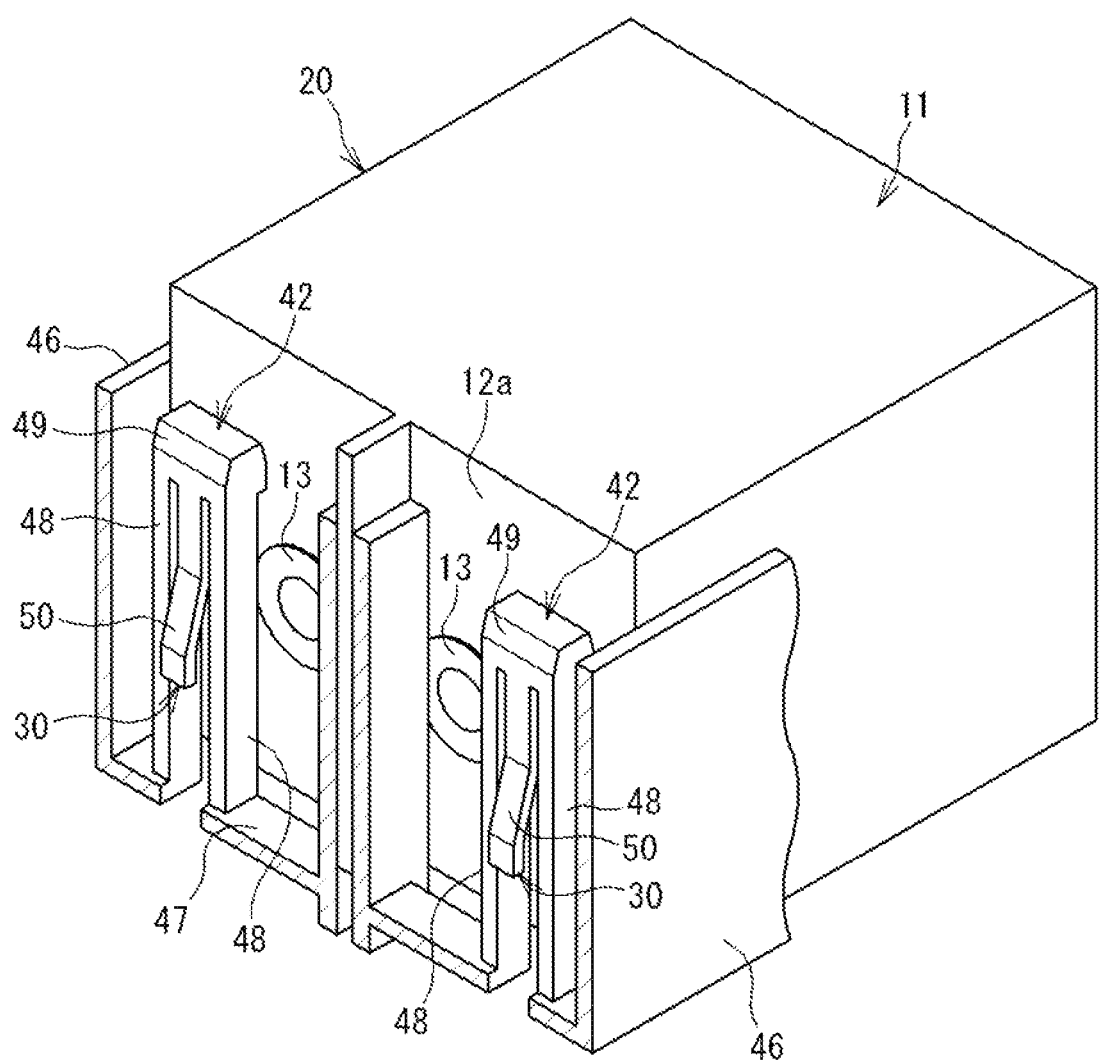
FIG. 9 is a diagram illustrating second piece portions of the attachment portion.

FIG. 9 is a diagram illustrating the second piece portions 42 included in the attachment portion 20. Note that FIG. 9 shows the relay 11 attached to the attachment portion 20, but the bus bars 15 are omitted. The second piece portion 42 is a columnar portion that is provided extending upward from a part (lower portion) 47 of the first case 21 at a position toward the relay 11 side with respect to the first piece portion 41.

The second piece portion 42 has the above-described stopper portion 30. A specific configuration thereof will be described. The second piece portion 42 is a pair of column portions 48, 48 that are provided extending upward from a part 47 of the first case 21, a connecting portion 49 connecting these column portions 48, 48, on the upper side, and a beam portion 50 that is cantilevered from the connecting portion 49 and is provided extending to the above-described part 47 side, which is the lower side. This beam portion 50 functions as the stopper portion 30.

With the cover 23 attached as shown in FIG. 7, a tip portion 50a of the beam portion 50 comes into contact with the rear surface of the part of the front wall portion 24. As a result, the beam portion 50 suppresses the displacement (deformation) of the part of the front wall portion 24 in the direction in which the engagement portion 28 is disengaged (arrow P direction). Furthermore, in a state in which the tip portion 50a of the beam portion 50 is in contact with the front wall portion 24, the beam portion 50 is in a state of being elastically deformed toward the relay 11 side. That is, the beam portion 50 that functions as the stopper portion 30 has a spring property for biasing the part of the front wall portion 24 in the direction opposite to the direction in which the engaging portion 28 is disengaged (the direction opposite to the arrow P).

Note that in the present embodiment, the stopper portion 30 is constituted by the cantilever-shaped beam portion 50, but the stopper portion 30 may also have another configuration and need not have an active spring property. For example, the beam portion 50 need not be elastically deformed in a state where the tip portion 50a of the beam portion 50 is close to (or in contact with) the front wall portion 24. For example, it is also possible to use a configuration in which, when the part of the front wall portion 24 is displaced to the relay 11 side by an external force, the part of the front wall portion 24 comes into contact with the beam portion 50, and the contact causes the beam portion 50 to restrict the displacement of the part of the front wall portion 24. That is, the stopper portion 30 may have a function of suppressing displacement (deformation) of the part of the front wall portion 24 in the direction in which the engaging portion 28 is disengaged (the direction of arrow P). With such a stopper portion 30, it is possible to prevent the engagement between the hole 29a and the hook 28a from being disengaged unless the task is performed forcibly using a tool or the like.

Regarding Electrical Connection Box 10 of the Present Embodiment

As described above, the electrical connection box 10 of the present embodiment includes the relays 11, the bus bars 15 connected to the terminals 13 of the relays 11, the case 16 having the attachment portions 20 for the relays 11, and the covers 23. The cover 23 covers the connection portions 18 between the relay 11 and the bus bars 15. The cover 23 has the front wall portion 24 for covering the connecting portions 18, and the engaging portions 28 each provided at a part of the front wall portion 24. The engaging portion 28 prevents the cover 23 from coming off by engaging with a part of the attachment portion 20. Also, the attachment portion 20 has a stopper portion 30 that suppresses displacement of the part of the front wall portion 24 in the direction in which the engaging portion 28 is disengaged.

According to the electrical connection box 10 of the present embodiment, the engaging portions 28 that are each provided on the part of the front wall portion 24 of the cover 23 prevent the cover 23 that covers the connection portions 18 between the relay 11 and the bus bars 15 from coming off of the attachment portion 20 of the case 16. The stopper portion 30 of the attachment portion 20 suppresses displacement of the part of the front wall portion 24 in the direction in which the engaging portion 28 is disengaged. For this reason, even if the first case 21 and the second case 22 are separated from each other, the cover 23 is kept in a state of being mounted on the attachment portion 20. Also, according to the stopper portion 30, the cover 23 can be prevented from coming off unless it is forcibly removed with a tool or the like, and a highly safe electrical connection box 10 can be obtained.

Also, in order to change from the state shown in FIG. 8 to the mounted state shown in FIG. 7, the relay 11 with the bus bars 15 is installed in the attachment portion 20 of the case 16, and when the cover 23 is attached to the connection portions 18 between the relay 11 and the bus bars 15 from above, the stopper portion 30 is pushed by the front wall portion 24 of the cover 23. In view of this, in the present embodiment, the stopper portion 30 has a spring property for biasing the part of the front wall portion 24 in the direction opposite to the direction in which the engaging portion 28 is disengaged. According to this configuration, when the cover 23 is attached, the stopper portion 30 may be pushed by the front wall portion 24 of the cover 23, but even in this case, the stopper portion 30 can be elastically deformed, and the cover 23 is easily attached. Then, once the cover 23 is attached, the stopper portion 30 can suppress displacement of the part of the front wall portion 24 in the direction in which the engaging portion 28 is disengaged, and can even more effectively prevent the cover 23 from coming off.

As shown in FIGS. 7 and 8, the attachment portion 20 has a first piece portion 41 and a second piece portion 42 that sandwich the front wall portion 24 in the front-rear direction. The engaging portion 28 is formed on the first piece portion 41 side of the front wall portion 24 of the cover 23. The engaged portion 29 with which the engaging portion 28 engages is formed in the first piece portion 41, and the second piece portion 42 has the stopper portion 30. According to this configuration, the cover 23 is attached such that the front wall portion 24 thereof is sandwiched between the first piece portion 41 and the second piece portion 42. When the cover 23 is attached in this way, the engaging portion 28 engages with the engaged portion 29 of the first piece portion 41, and the stopper portion 30 of the second piece portion 42 suppresses displacement of the part of the front wall portion 24 in the direction in which the engaging portion 28 is disengaged. That is, if the cover 23 is attached, the function of the engaging portion 28 and the stopper portion 30 for preventing the cover 23 from coming off is established.

The engaging portion 28 is constituted by the hook 28a protruding from the front wall portion 24, and the engaged portion 29 is constituted by the hole 29a passing through the first piece portion 41. With this configuration, it is easy for an operator to visually confirm that the engaging portion 28 (hook 28a) is engaged with the engaged portion 29 (hole 29a), and the safety of the cover 23 is increased.

The case 16 has the first case 21 including the attachment portion 20 and the second case 22, which is detachable from the first case 21. The second case 22 covers at least a part of the attachment portion 20 of the first case 21 and forms a single piece with the first case 21. Also, as shown in FIG. 6, the cover 23 includes, on the second case 22 side, an opening 27 through which the bus bars 15 are passed between the relay 11 and the cover 23.

With this configuration, the bus bar 15 can be arranged pulled out from the opening 27 of the cover 23. The bus bar 15 pulled out from the opening 27 is stored between the first case 21 and the second case 22. The bus bar 15 shown on the right side of FIG. 6 pulled out from the opening 27 can be arranged bent to the relay 11 side, which is the rear side, as-is, and the bus bar 15 shown on the left side of FIG. 6 can be arranged bent to the opposite side, that is, the front side. That is, the degree of freedom in the arrangement (routing) of the bus bars 15 is improved.

Figure 10:
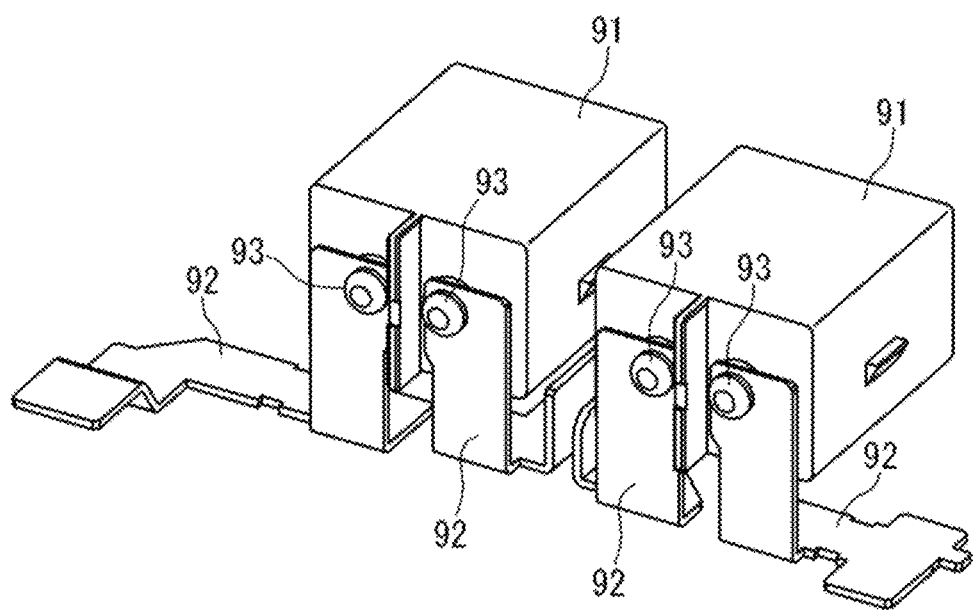
FIG. 10 is a perspective view of relays and bus bars housed in a case of a conventional electrical connection box.
Figure 11:
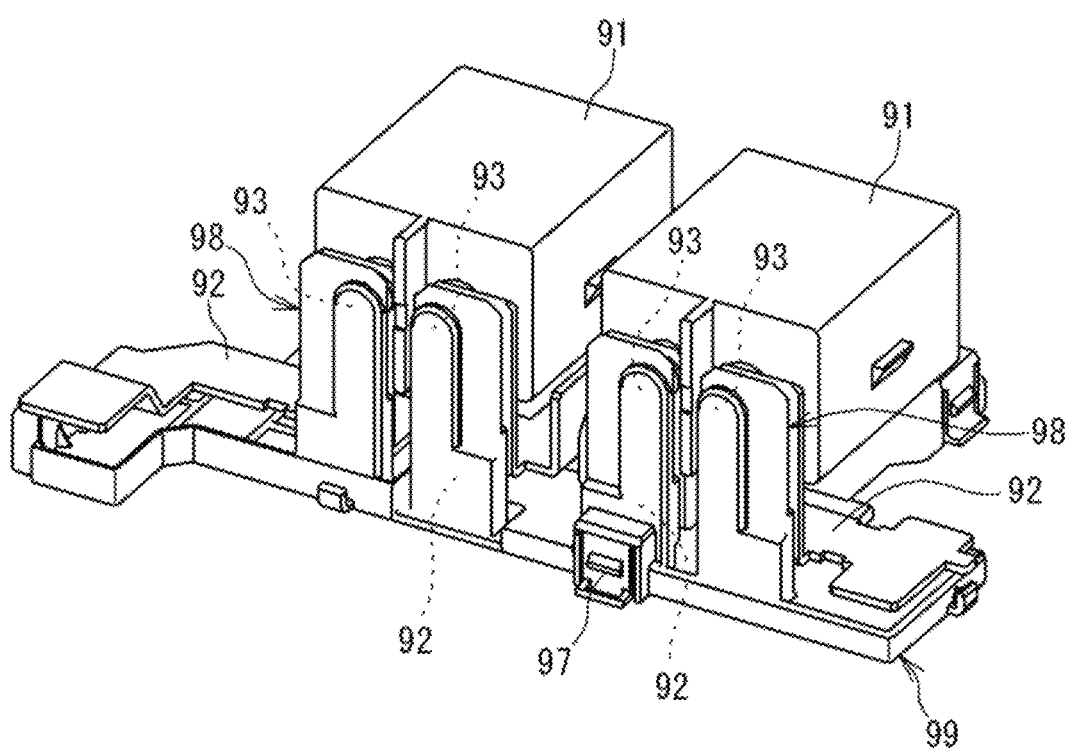
FIG. 11 is a perspective view showing a conventional example of a sealing structure.

In contrast to this, in the case of the conventional example shown in FIG. 11, the sealing structure portions 98 that cover the connection portions (heads of the bolts 93) between the relays 91 and the bus bars 92 form a single piece with the lower case 99, and are each provided extending upward from a portion of the lower case 99. For this reason, in the conventional example, as shown in FIG. 10, it is necessary to arrange all of the bus bars 92 bent to the relay 91 side, which is the rear side, such that the bus bars 92 do not interfere with the sealing structure portions 98, and thus the degree of freedom in the arrangement (routing) of the bus bars 92 is low.

Other Configurations

The cover 23 need only be configured to cover at least the connection portions 18 between the relay 11 and the bus bars 15, and may have a shape other than the mode shown in the drawings. The case 16 and the like may also have a shape other than the mode shown in the drawings.

The above-described embodiments are exemplary in all respects and not limiting. The scope of rights of the present invention is indicated not by the above-described embodiments, but by the scope of the claims, and encompasses all modifications within the range of equivalency to the configurations described in the scope of the claims.

What is claimed is:

1. An electrical connection box including a relay, a bus bar connected to the relay, the electrical connection box comprising:
    a case including an attachment portion for the relay, wherein the case includes a first case including the attachment portion;
    a second case that covers at least a part of the attachment portion of the first case and is configured to form a single piece with the first case;
    a cover covering a connection portion between the relay and the bus bar, wherein the cover includes, on the second case side, an opening through which the bus bar is passed between the relay and the cover;
    wherein the cover includes a wall portion and an engaging portion that is provided at a part of the wall portion and prevents the cover from coming off by engaging with a part of the attachment portion, and
    the attachment portion includes a stopper portion for suppressing displacement of the part of the wall portion in a direction in which the engaging portion is disengaged.

2. The electrical connection box according to claim 1, wherein the stopper portion has a spring property for biasing the part of the wall portion in a direction opposite to the direction in which the engaging portion is disengaged.

3. The electrical connection box according to claim 1, wherein the attachment portion includes a first piece portion and a second piece portion that sandwich the wall portion,
    the engaging portion is formed on the first piece portion side of the wall portion,
    an engaged portion with which the engaging portion engages is formed on the first piece portion, and
    the second piece portion includes the stopper portion.

4. The electrical connection box according to claim 3, wherein the engaging portion is constituted by a hook that protrudes from the wall portion, and
    the engaged portion is constituted by a hole that passes through the first piece portion.

5. The electrical connection box according to claim 2, wherein the attachment portion includes a first piece portion and a second piece portion that sandwich the wall portion,
    the engaging portion is formed on the first piece portion side of the wall portion,
    an engaged portion with which the engaging portion engages is formed on the first piece portion, and
    the second piece portion includes the stopper portion.

* * * * *